United States Patent [19]

Okamura et al.

[11] Patent Number: 4,865,904

[45] Date of Patent: Sep. 12, 1989

[54] LAMINATED CLOTH

[75] Inventors: Chikaaki Okamura, Uji; Akihito Fujita; Tamotu Nagao, both of Takatsuki; Fumihiko Yoshida, Ibaraki, all of Japan

[73] Assignee: Sunstar Giken Kabushiki Kaisha, Takatsuki, Japan

[21] Appl. No.: 94,744

[22] Filed: Sep. 9, 1987

[30] Foreign Application Priority Data

Sep. 10, 1986 [JP] Japan .................................. 61-214895

[51] Int. Cl.$^4$ .......................... B32B 7/00; B32B 27/30
[52] U.S. Cl. ..................... 428/215; 428/272; 428/522; 428/520; 428/265; 428/286
[58] Field of Search ................. 428/265, 272, 522, 215

[56] References Cited

U.S. PATENT DOCUMENTS

| | | | |
|---|---|---|---|
| 2,979,423 | 4/1961 | Weinberg | 428/265 |
| 3,531,365 | 9/1970 | Melin | 428/265 |
| 4,010,305 | 3/1977 | Wang | 428/522 |
| 4,104,430 | 8/1978 | Fenton | 428/522 |
| 4,245,076 | 1/1981 | Marquardt | 428/522 |
| 4,284,681 | 8/1981 | Tidmarsh et al. | 428/522 |
| 4,358,499 | 11/1982 | Hill | 428/522 |
| 4,454,191 | 6/1984 | von Blücher et al. | 428/265 |

*Primary Examiner*—George F. Lesmes
*Assistant Examiner*—George F. Ibrahim
*Attorney, Agent, or Firm*—Wegner & Bretschneider

[57] ABSTRACT

A laminated cloth which comprises (A) a cloth and (B) a crosslinking polyvinyl chloride skin layer, and optionally (C) a polyvinyl chloride layer as a primary coat for the layer (B), said laminated cloth having improved deep drawing properties and excellent tolerant to vacuum forming and being useful as a covering for interior trims of automobiles and other vacuum forming products and also as a surface decorating material for various products.

2 Claims, No Drawings

4,865,904

LAMINATED CLOTH

This invention relates to a laminated cloth, more particularly, to a laminated cloth having improved deep drawing properties which is suitable as a covering of interior trims for automobiles produced by vacuum forming.

PRIOR ART

As a covering for interior trims for automobiles (e.g. instrument pad, console box, glove lid, door trim, pillar, etc.), there have been used various cloths such as sealskin cloth, leather back skin like materials, suede like materials, and the like in order to improve the residing comfortability, product salability, or to give excellent feeling as being deluxe or soft, and/or to improve safety such as prevention of dizzy feeling or cushion properties. These cloths are usually baked in order to be made torelant to vacuum forming. For example, they are subjected to (1) laminating with a thermoplastic sheet such as polyvinyl chloride (abbreviated as "PVC") by an adhesive, or (2) heat-bonding with a thermaplastic sheet having excellent moldability such as acrylonitrile-butadine-styrene (abbreviated as "ABS") resin sheet under high pressure by an adhesive.

However, according to the above process (1), the cloth and sheet are adhered at points and hence the cloth layer can not follow to extension of the sheet, which results in undesirable peeling or breaking of the sheet. In order to prevent such a drawback, it is drawn by vacuum from the side of the cloth, but in this process, the appearance of the cloth is significantly deteriorated. On the other hand, according to the process (2), the sheet having a high molding temperature is heat-molten and then impregnated into the cloth under high pressure, and hence, the appearance of the cloth (pile height, handle or drape, etc.) is deteriorated. Furthermore, the product shows significantly low viscoelasticity in the region impregnated with the sheet which results in peeling of sheet.

SUMMARY DESCRIPTION OF THE INVENTION

In order to solve or improve the problems in backing as mentioned above as well as the deep drawing properties of the cloth, the present inventors have intensively studied and found that an improved laminated cloth having desired properties can be prepared by impregnating a plastisol of a crosslinking polyvinyl chloride at the back of the cloth, followed by melting and crosslinking, whereby the cloth and the crosslinked polyvinyl chloride layer are formed in one piece.

An object of the invention is to provide an improve laminated cloth having excellent deep drawing properties which is suitable as a covering for interior trims of automobiles. Another object of the invention is to provide a laminated cloth comprising a cloth and a crosslinking polyvinyl chloride skin layer which can be molded under vacuum without deterioration of the appearance of the cloth. These and other objects advantages of the invention will be apparent to those skilled in the art from the following description.

DETAILED DESCRIPTION OF THE INVENTION

The laminated cloth of the invention comprises (A) a cloth and (B) a crosslinking polyvinyl chloride skin layer which is formed by impregnating a plastisol of a crosslinking polyvinyl chloride into the back of the cloth (A), followed by melting and crosslinking.

The cloth for the (A) layer are not restricted but includes any conventional cloth, such as sealskin, leather back skin like or suede like materials, tricot fabrics, moquette fabrics, felts, non-woven fabrics, carpets, and the like.

The crosslinking polyvinyl chloride skin layer (B) is formed by using a plastisol composition which comprises a main component consisting essentially of 100 parts by weight of a crosslinking PVC and 30 to 150 parts by weight of a plasticizer in admixture with an equimolar amount of a polyisocyanate as a crosslinking agent and optionally an appropriate amount of a stabilizer or catalyst (e.g. dibutyl tin dilaurate, dibutyl tin dimaleate, dibutyl tin phthalate, stannous laurate, Ba-Zn stabilizers, etc.), a filler (e.g. calcium carbonate, carbon black, bentonite, titanium oxide, ferric oxide, talc, etc.), a pigment, and the like.

The crosslinking PVC includes PVC having at least two crosslinking groups (e.g. hydroxy, carboxy, or amino group) in the molecule, for example, a copolymer of a monomer containing crosslinking groups (e.g. 2-hydroxyethyl methacrylate, 2-hydroxypropyl methacrylate, ethyl 2-hydroxyethyl fumarate, hydroxybutyl vinyl ether, etc.) and vinyl chloride. The crosslinking PVC may optionally be admixed with a usual PVC [i.e. PVC having a mean polymerization degree $(\overline{P}) = 1{,}000\text{--}4{,}000$] in an amount of not more than 50 parts by weight per 100 parts by weight of the crosslinking PVC.

The plasticizer used in the invention includes, for example, phthalic esters (e.g. dioctyl phthalate (abbreviated as "DOP"), diisodecyl phthalate (abbreviated as "DIDP"), dibutyl phthalate (abbreviated as "DBP"), diundecyl phthalate (abbreviated as "DUP"), butyl benzyl phthalate, etc.), glycol esters (e.g. diethylene glycol dibenzoate, pentaerythritol esters, etc.), fatty acid esters (e.g. butyl oleate, methyl acetylricinolate, etc.), phosphates (e.g. tricresyl phosphate, trioctyl phosphate, octyl diphenyl phosphate, etc.), epoxylated soybean oil, chlorinated paraffin, and the like.

The polyisocyanate used as a crosslinking agent includes, for example, tolylene diisocyanate (abbreviated as "TDI"), isophorone diisocyanate (abbreviated as "IPDI"), triphenylmethane triisocyante, triisocyante phenylthiophosphate, trimethylolpropane adduct of tolylene diisocyanate, a specific grade of diphenylmethane-4,4′-diisocyanate (abbreviated as "MDI") (Millionate ® MR, manufactured by Nippon Polyurethane K.K., Japan), and the like.

The laminated cloth of the invention may optionally contain a layer (C) as a primary coat for the skin layer (B) in addition to the above cloth layer (A) and the crosslinking skin layer (B). The layer (C) comprises a skin layer of a conventional PVC and is formed in order to improve processing stability for vacuum forming (i.e. improvement of processability, bridging property, drawdown, molding shrinkage, decrease of heat nonuniformity onto the layer (B), shape retention in molding, etc.), to give good cushion to the molded product, and further to prevent migration of plasticizer from the layer (B) or harmful substances from the substrates (particularly deterioration of the covering due to migration of residual amine catalyst from polyurethane foam). The layer (C) is usually formed by applying a paste sol composition comprising a PVC ($\overline{P}$=1,000 to 4,000), a plasticizer, a stabilizer, and a filler, etc. Instead of the PVC layer (C), an ABS sheet may be used for the same purpose.

The laminated cloth of the invention can be prepared by the following procedure.

(I) In case of forming the primary coat layer (C):

(i) A paste sol composition for the layer (C) is applied onto a substrate (e.g. a releasing paper) and gelled with melting to form the layer (C). The layer (C) has usually a thickness of 0.1 to 2.0 mm.

(ii) A plastisol composition for the crosslinking skin layer (B) is applied onto the layer (C) usually in a thickness of 0.1 to 2.0 mm, and thereon a cloth is laminated under a linear pressure of 0.1 to 5.0 kg/cm, by which a part of the plastisol composition for the layer (B) is impregnated into the tissue of the cloth at the back thereof (by the impregnation, the adhesion area is enlarged). Thereafter, the laminated product is subjected to crosslinking with melting and then the substrate is peeled off to give the desired laminated cloth.

(II) In case of applying no primary coat:

In the same manner as described in the above case (I) except that the layer (C) is not formed, the plastisol composition for the crosslinking skin layer (B) is directly applied to the substrate, and thereon the cloth is laminated, followed by crosslinking with melting to give the desired laminated cloth. In the above process, when the plastisol composition is applied to the cloth instead of the substrate, the appearance and handle or drape of the cloth are disadvantageously deteriorated.

(III) In case of forming ABS sheet as the primary coat:

At the side of the skin layer (B) of the laminated cloth obtained in the above (II), an ABS sheet is laminated.

The laminated cloth of this invention is characteristic in that a crosslinking PVC layer is formed in impregnated state at the back of the cloth, and thereby, the product shows the following advantages when used as a covering for interior trims molded by vacuum forming.

(i) The cloth well follows to change of shape in tissue when molding, and hence, no peeling between the laminated layers is observed.

(ii) The product has excellent form retention when molded.

(iii) When the product is subjected to processing with high frequency welding, the peel strength is not deteriorated.

(iv) It has excellent heat creep resistance of peel strength.

(v) It can be deep-drawn and formed into a complicated shape by vacuum forming.

The laminated cloth of this invention is particularly useful as a covering for vacuum forming products such as interior trims of automobiles, but is also useful as a surface decorating material for other various products (e.g. bags, luggages, furnitures, etc.).

The present invention is illustrated by the following Examples but should not be construed to be limited thereto.

EXAMPLE 1

Layer (A) (cloth): A sealskin tricot fabric for molding (manufactured by Seiren K.K., Japan).

| Components | Part by weight |
| --- | --- |
| Crosslinking skin layer (B) (Composition B): | |
| Crosslinking PVC (a copolymer of 2-hydroxyethyl methacrylate and vinyl chloride, manufactured by Mitsubishi Monsant K. K., Japan) | 100 |
| DUP (manufactured by Shin Nihon Rika K. K., Japan) | 50 |
| Epoxylated soybean oil (ESBO, manufactured by Adeka Agas Chemical K. K., Japan) | 3 |
| Dibutyl tin dilaurate (TS 101, manufactured by Akijima Kagaku K. K., Japan) | 3 |
| Ba—Zn stabilizer (AC 111, manufactured by Adeka Agas K. K., Japan) | 5 |
| Polyisocyanate compound (Colonate L, manufactured by Nippon Polyurethane K. K., Japan) | 6 |
| Layer (C) (Composition C): | |
| PVC paste (G-121, manufactured by Nippon Zeon K. K., Japan) | 100 |
| DUP | 60 |
| ESBO | 5 |
| AC 111 | 5 |
| Carbon black | 5 |

The composition (C) is applied onto a releasing paper (manufactured by Warren Co.) in a thickness of 0.50 mm, and the resultant is subjected to melt-gelation at 230° C. for 30 seconds. Onto the resultant, the composition (B) is applied in a thickness of 0.55 mm, and thereon the cloth is laminated under a linear pressure of 0.5 kg/cm. The resultant is subjected to crosslinking (gelation) with melting at 200° C. for 2 minutes and 30 seconds, and thereafter, the releasing paper is taken off to give a laminated cloth consisting of a cloth, a crosslinking skin layer (B) and a layer (C).

The laminated cloth was used as a covering for preparing an instrument pad as follows:

The laminated cloth was subjected to vacuum forming at a surface temperature of 145°–165° C. to the desired shape (the maximum area ratio for extension: 200%) and thereinto a polyurethane foam was loaded to form the desired instrument pad. As a result, there was not observed any peeling or break of the back sheet, and the product had good shape retention.

EXAMPLE 2

Layer (A) (cloth): A moquette fabric (manufactured by K.K. Kawashima Orimono, Japan).

| Components | Part by weight |
| --- | --- |
| Crosslinking skin layer (B) (Composition B): | |
| Crosslinking PVC | 100 |
| DIDP | 75 |
| ESBO | 3 |
| TS 101 | 3 |
| AC 101 | 5 |
| Colonate L | 3 |
| Layer (C) (Composition C): | |
| PVC paste (PSH 20, manufactured by Kanegafuchi Chemical, Japan) | 100 |
| DIDP | 75 |
| ESBO | 3 |
| AC 111 | 5 |
| Calcium carbonate | 20 |
| Carbon black | 2 |
| Titanium dioxide | 5 |

The composition (C) is applied onto a releasing paper in a thickness of 0.30 mm, and the resultant is subjected to melt-gelation at 230° C. for 30 seconds. Onto the resultant, the composition (B) is applied in a thickness of 0.50 mm, and thereon the cloth is laminated under a linear pressure of 0.5 kg/cm. The resultant is subjected to crosslinking (gelation) with melting at 200° C. for 2 minutes and 30 seconds, and thereafter, the releasing paper is taken off to give a laminated cloth consisting of a cloth, a crosslinking skin layer (B) and a layer (C).

The laminated cloth was subjected to vacuum forming at a surface temperature of 150°–170° C. in the same manner as described in Example 1. As a result, there was not observed any peeling or break of the back sheet, and the product could be applied to a pre-formed door panel substrate in high frequency welding process.

What is claimed is:

1. A laminated cloth which comprises:
   (A) a cloth,
   (B) a crosslinking polyvinyl chloride skin layer having a thickness of 0.1 to 2.0 mm, and
   (C) a polyvinyl chloride skin layer having a thickness of 0.1 to 2.0 as a primary coat, which is produced by applying a paste sol composition comprising a polyvinyl chloride having a mean polymerization degree of 1,000 to 4,000, a plasticizer, a stabilizer and a filler onto a substrate and gelling with melting to form the polyvinyl chloride skin layer (C), applying onto the skin layer (C) a plastisol composition comprising 100 parts by weight of a crosslinking polyvinyl chloride and 30 to 150 parts by weight of a plasticizer in admixture with an equimolar amount of a polyisocyanate as a crosslinking agent and optionally an appropriate amount of a stabilizer or catalyst, a filler and a pigment to form the crosslinking polyvinyl chloride skin layer (B), and laminating thereon the cloth (A) and thereby impregnating a part of the plastisol composition for the layer (B) into the tissue of the cloth at the back of thereof, followed by subjecting the laminated product to crosslinking with melting, and then peeling off the substrate, wherein the crosslinking polyvinyl chloride being a polyvinyl chloride having at least two crosslinking groups selected from the group consisting of hydroxy, carboxy and amino groups.

2. The laminated cloth according to claim 1, wherein the crosslinking polyvinyl chloride is a copolymer of vinyl chloride and a monomer selected from the group consisting of 2-hydroxyethyl methacrylate, 2-hydroxypropyl methacrylate, ethyl 2-hydroxyethyl fumarate, and 2-hydroxybutyl vinyl ether.

* * * * *